(12) United States Patent
Morterol

(10) Patent No.: US 6,398,463 B1
(45) Date of Patent: Jun. 4, 2002

(54) PROCESS FOR INTRODUCING A SOLID CATALYST INTO A FLUIDIZED OR AGITATED VESSEL

(75) Inventor: Frederic Robert Marie Michel Morterol, Sausset-les-Pins (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/767,139

(22) Filed: Jan. 23, 2001

Related U.S. Application Data

(63) Continuation of application No. PCT/GB99/02464, filed on Jul. 28, 1999.

(30) Foreign Application Priority Data

Jul. 31, 1998 (EP) .............................. 98430019

(51) Int. Cl.⁷ .............................. B65G 53/04
(52) U.S. Cl. ................. 406/146; 406/108; 222/195; 222/630; 222/637; 526/86; 526/919
(58) Field of Search .................... 526/88, 919, 86; 406/108, 146; 222/195, 630, 637

(56) References Cited

U.S. PATENT DOCUMENTS 3,573,200 A   3/1971   Vogel ......................... 208/173

FOREIGN PATENT DOCUMENTS

| EP | 0 032 064 | 7/1981 |
| EP | 0 728 771 | 8/1996 |
| FR | 981.775 | 5/1951 |
| GB | 2 274 110 | 7/1994 |

OTHER PUBLICATIONS

A Haider, et al., "Drag Coefficient and Terminal Velocity of Spherical and Nonspherical Particles", *Powgder Technology*, vol. 58, pp. 63–70 (1989).

*Primary Examiner*—Fred Teskin
(74) *Attorney, Agent, or Firm*—Finnegan, Henderson, Farabow, Garrett & Dunner, L.L.P.

(57) ABSTRACT

A process for introducing a solid catalyst particle feed into a fluidised or agitated vessel utilising a feed delivery device, a vertical feed dilution pipe and a feed injection pipe connected to the vessel, the process including the steps of: (a) introducing the solid catalyst particles feed from the feed delivery device into the vertical feed dilution pipe, (b) diluting the solid catalyst particles feed by letting the solid particle reaching by gravity their terminal velocity in the feed dilution pipe, (c) introducing the diluted solid catalyst particles feed into the injection pipe and mixing it with conveying gas, and introducing the gas conveyed diluted solid catalyst particles feed into the vessel.

7 Claims, 1 Drawing Sheet

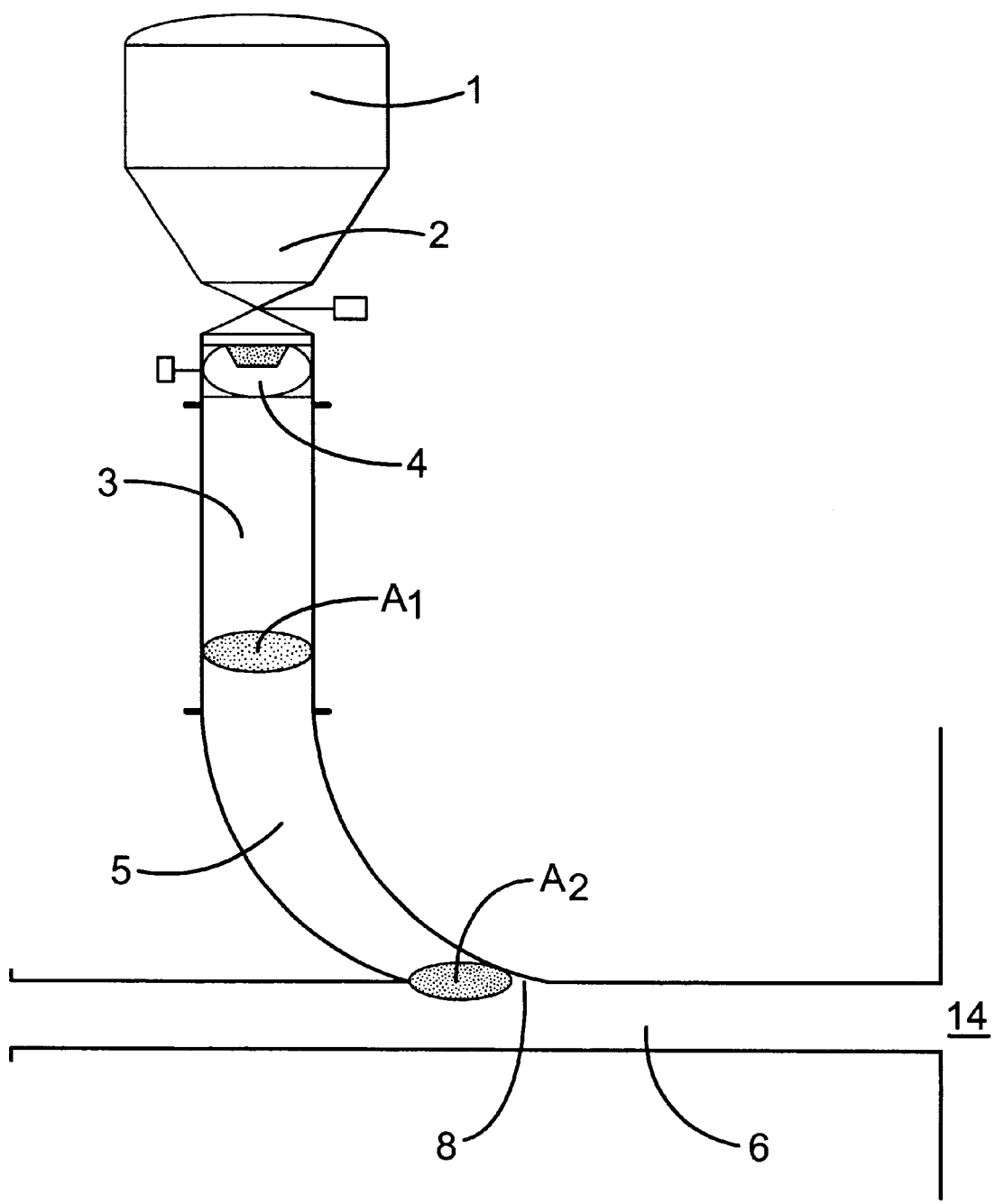

PROCESS FOR INTRODUCING A SOLID CATALYST INTO A FLUIDIZED OR AGITATED VESSEL

This application is a continuation of international application number PCT/GB99/02464, filed Jul. 28, 1999.

BACKGROUND OF THE INVENTION

The present invention relates to a process for introducing a solid into a fluidised or agitated vessel and in particular for introducing a catalytically active solid into a fluidised or agitated vessel. It also relates to an apparatus for carrying out said process.

French Patent Application n° 2 562 077 discloses a process and an apparatus for introducing a powdery catalyst into a fluidised bed reactor for the gas phase polymerisation of olefins. The catalyst powder is conveyed into the reactor in the form of a dense and compacted powder,. i.e. in 'plug flow' or 'packed bed' mode. Such 'plug flow' or 'packed bed' flow generally results in poor dispersion of the catalyst inside the reactor causing the formation of hot-spots, and possibly agglomeration of polymer, which may lead to termination of the reaction.

French Patent Application n° 2 705 252 discloses a process for introducing a solid into a reactor wherein the solid is first introduced into a feed enclosure and subsequently, on introduction of a gas into the feed enclosure, is suspended in the gas. The gas is introduced into the feed enclosure above the uppermost level of the solid. While this technique already represents an improvement in term of catalyst dispersion, major improvements were still needed in the art.

A process and apparatus have now been found for introducing a solid into a fluidised or agitated vessel without the abovementioned drawbacks i.e. a process and apparatus which provide for improved entry of the solid into the vessel and which also provide for improved dispersion of the solid in the vessel, particularly when a gas phase reactor such as a fluidised bed reactor is used.

SUMMARY OF THE INVENTION

Accordingly, the present invention provides a process for introducing a solid particles feed into a fluidised or agitated vessel utilising a feed delivery device, a vertical feed dilution pipe and a feed injection pipe connected to the vessel, said process comprising the following steps:

(a) introducing the solid particles feed from the feed delivery device into the vertical feed dilution pipe, (b) diluting the solid particles feed by letting the solid particles reaching by gravity their terminal velocity in the feed dilution pipe, (c) introducing the diluted solid particles feed into the injection pipe and mixing it with a conveying gas, and (d) introducing said gas conveyed diluted solid particles feed into the Vessel.

BRIEF DESCRIPTION OF THE DRAWING

The drawing shows suitable apparatus for carrying out the process of the present invention.

DETAILED DESCRIPTION OF THE INVENTION

During the first stage of the process, the solid particles feed is introduced from the feed delivery device into the vertical feed dilution pipe. For example, the feed delivery device may be a pneumatic transport through a gas/solid separator (e.g. a cyclone) or a storage vessel through a delivery means (e.g. a feed valve or a rotary valve).

According to the present invention it is required that the consecutive dilution of the solid particles En the vertical dilution pipe is performed by letting the solid particles reaching by gravity their terminal velocity. The Applicants have found that any departure from said primary condition would result in an introduction into the reactor made in a dense or compacted powder mode. A preferred embodiment according to the present invention is that hereabove steps (a) and (b), i.e. the introduction of the solid particles feed into the vertical feed dilution pipe and the following solid particles dilution obtained by letting the solid particles reaching by gravity their terminal velocity, should be done in the absence of any conveying, motive or flushing gas.

During this stage the vertical feed dilution pipe may contain an initial gas under pressure e.g. from 0.15 to 6.5 MPa.

The dimensions of vertical feed dilution pipe are such that the solid particles can reach by gravity their terminal velocity inside the pipe. Beyond this stage, the solid particles reach an ideally diluted form.

Again, a preferred feature according to the present invention is that said ideally diluted form is obtained in the absence of any conveying, motive of flushing gas.

The vertical feed dilution pipe is preferably in the form of a cylinder and or a cone having an upper section smaller than the lower section, preferably a cylinder.

Further, in order to have the full benefit of the present invention, it is preferred during their gravity fall inside the vertical feed dilution pipe that the solid particles are not drawn by suction; for example, a jet pump or ejector is typically excluded from the present invention. According to the present invention it is indeed preferred that substantially no pressure difference exists within the vertical feed dilution pipe The terminal velocity($u_r$) of a solid particle falling through a fluid can be calculated from the following equation:

$$u_* = u_t\left[\frac{\rho_f^2}{g\mu(\rho_s - \rho_f)}\right]^{1/3}$$

$$u_* = \left[\frac{18}{d_*^2} + \frac{(2.3348 - 1.7439\phi)}{d_*^{0.5}}\right]^{-1}$$

$$d_* = d_{sph}\left[\frac{g\rho_f(\rho_s - \rho_f)}{\mu^2}\right]^{1/3}$$

wherein $d_{sph}$ equivalent spherical diameter [m]

d* dimensionless particle diameter g=9.81 m/s².

Information on terminal velocity and its calculation can be found in Haider A. and Levenspiel O., "Powder Technology", 58 (1989)63–70.

The vertical feed dilution pipe preferably has a volume which represents advantageously from 2 to 10000, preferably from 3 to 300 times the volume of solid particles to be introduced.

The vertical feed dilution pipe has a length chosen so as to make it possible to ideally dilute the solid particles.

Preferably, the vertical feed dilution pipe has a length comprised between 5 and 2000 cm, more preferably between 20 and 100 cm, and a diameter comprised between 3 and 200 mm, more preferably between 6 and 100 mm. For a solid particles feed made of silica having a mean diameter of 50 µm, the vertical feed dilution pipe may for example be a cylinder having a length of 70 cm and a section having a diameter of 15 mm.

During the second stage of the process, the diluted solid particles feed is introduced into the injection pipe wherein it is mixed with a conveying gas and finally introduced into the fluidised or agitated vessel.

The injection pipe may be provided with an entry means e.g. an entry valve, which is opened in order to bring the dilution pipe into communication with the vessel via the injection pipe. Preferably, there is no valve and the conveying gas is continuously introduced into the vessel.

The conveying gas introduced into the injection pipe is generally introduced at a pressure higher than the pressure in the reactor, e.g. a pressure of 0.01 to 1.5 MPa, preferably 0.1 to 1.0 MPa higher than the pressure in the reactor. In particular, the pressure of the gas introduced into the injection pipe is from 0.15 to 6.5 MPa, while the pressure in the reactor may be from 0.1 to 5 Mpa. The conveying gas may be inert towards the solid and, in particular, may be nitrogen. Preferably, the conveying gas is the process gas.

The present invention also provides for an apparatus (as shown diagrammatically in the drawing) for introducing a solid into a reactor (14) preferably under a relatively high pressure, the apparatus consisting essentially of:

a feed delivery device comprising a means (4) for introducing the solid into the vertical dilution pipe (3), and an injection pipe (6).

The apparatus may include a storage enclosure (1) which may be of a vertical cylindrical shape, the lowest part (2) of which may advantageously be of a conical shape oriented downwards. In industrial plants the storage enclosure usually has a relatively large volume such that solid may be fed to the reactor over a period ranging from 0.5 to 5 days. It may be advantageously provided with an agitating system in order to avoid the formation of solid agglomerates. Furthermore, the solid in the enclosure may be stored under an inert atmosphere.

The means (4) for introducing solid into the vertical dilution pipe (3) may consist essentially of a rotary valve comprising a cavity which can communicate alternately with the lowest part (2) of the storage enclosure (1) and with the top of the dilution pipe (3). The rotary valve (4) may be one of the rotary valves described in French Patent Applications No. 2,562,077 and No. 2,587,081.

The injection pipe (6), which is preferentially cylindrical, connects the outlet (8) of the dilution pipe to the reactor (14). The outlet (8) has preferentially a cylindrical section (A2) identical to the one of the vertical dilution pipe (A1), as shown in the drawing. The injection pipe (6) may open into the reactor (14) in a direction which may be perpendicular or substantially perpendicular to the wall of the reactor, or in an upwards or downwards direction. The injection pipe (6) is preferably designed for providing a dilute-phase conveying system working preferably under relatively high pressure e.g. from 0.15 to 6.5 Mpa with a solid generally consisting of very fine particles e.g. with a mean diameter from 5 to 2000 or 10 to 250 microns. In these particular conditions, the internal diameter of the injection pipe (1) may be e.g. in the range from 5 to 200 mm, preferably 6 to 100 mm.

The vertical dilution pipe may comprise a bend (5) at its lower end, i.e. before its connection with the injection pipe. The angle of the bend may be from 10° to 50° and is usually about 40°.

The vessel (14) may advantageously be a gas phase reactor such as a fluidised bed and/or a mechanically stirred bed reactor it may be under pressure, especially of from 0.1 to 5 Mpa. The reactor may be used for polymerizing olefins. It is preferably an olefin polymerization fluidised bed reactor, e.g. a reactor using equipment such as that described in French patent No. 2 207 145, French patent No. 2 335 526, EP-B-0 699213, EP-B-0 89691 or U.S. Pat. No. 5352749.

The present invention makes it possible to introduce into a reactor, in particular under a relatively high pressure, a solid in gas. It is particularly advantageous for introducing a solid which has relatively poor flow properties. A test for determining the flowability of a powder is described in EP-A-0 275 675. The present invention is particularly useful for powders which can flow freely in a hopper similar to those described in EP-A-0 275 675, especially in a hopper having the following features: the bottom opening diameter of 5 mm, the top opening diameter of 40 mm and the height of 67.5 mm. Furthermore, the present invention is highly recommended for introducing small quantities of solid into a reactor. In particular, it is very easily possible to introduce from 1 to 1200, in most cases from 1 to 50 g e.g. from 5 to 50 g of solid per injection sequence. The solid may be a powder consisting of fine or very fine particles having a mass-mean diameter of 5 to 2000 microns, preferably 10 to 250 microns, especially 40 to 120 microns. The solid may have a bulk density of 0.1 to 0.6 g/cm$^3$, e.g. 0.2 to 0.4 g/cm$^3$.

In particular, the process according to the invention is very suitable for introducing catalysts used for manufacturing polyolefins in powder form, in particular of high or linear low density polyethylene, of relative density ranging, for example, from 0.87 to 0.97, or of polypropylene, or of copolymers of propylene with ethylene and/or C4 to C8 olefins, or of elastomeric copolymers of propylene with ethylene and optionally at least one unconjugated diene, of relative density ranging, for example, from 0.85 to 0.87. The polymers so manufactured may in particular be powders corresponding essentially to the B type and sometimes to the A and B types, according to the classification given by D. Geldart in "Gas Fluidization Technology" published in "A Wiley-Interscience Publication" by John-Wiley & Sons (1986), pages 33 to 46. The polymers may consist of particles which have a mass-average diameter ranging from 300 to 2500, preferably from 500 to 1500 µm.

When the process of the present invention is used in a gas phase continuous polymerisation of olefin(s), said polymerisation is preferably carried out in a reactor containing a fluidised and optionally mechanically stirred bed. The temperature of the fluidised bed may be maintained at a value ranging from 30 to 130° C., preferably from 50 to 1100° C. A gas reaction mixture passes through the reactor at an upward speed which may range from 0.3 to 1 m/s, preferably from 0.4 to 0.8 m/s. The reaction gas mixture may contain one or more olefins, especially from C2 to C10, preferably from C2 to C8, for example ethylene or propylene, or a mixture of ethylene with at least one C3 to C10, preferably C3 to C8, olefin, for example propylene, 1-butene, 1-hexene, 4-methyl-1-pentene or 1-octene and/or else with at least one diene, for example an unconjugated diene. It may also contain hydrogen and/or an inert gas such as nitrogen or an alkane, for example from C1 to C6, preferably from C2 to C5.

The solid may be a catalyst for a chemical reaction and in particular a catalyst for an olefin polymerisation reaction such as, for example, a catalyst of the Ziegler-Natta type or a metallocene catalyst or a catalyst based on chromium oxide activated by thermal treatment, or a prepolymer containing one of these catalysts.

For example, the catalyst which is introduced according to the present invention in the polymerization reactor can be a catalyst comprising at least one transition metal belonging to groups 4, 5 or 6 of the Periodic Classification of the elements (approved by the Nomenclature Committee of the "American Chemical Society", see "Encyclopedia of Inorganic Chemistry", editor R. Bruce King, published by John Wiley & Sons (1994)). In particular, a catalyst system of the Ziegler-Natta type may be employed, including a solid catalyst comprising a compound of a transition metal such as those mentioned above and a cocatalyst comprising an organometallic compound of a metal belonging to groups 1, 2 or 3 of the Periodic Classification of the elements, for example an organaluminium compound. High activity catalyst systems may also be used, such as those generally including a solid catalyst comprising essentially transition metal, magnesium and halogen atoms. It is also possible to employ a high activity catalyst essentially comprising a chromium oxide activated by a heat treatment and used in combination with a granular support based on refractor oxide. Metallocene catalysts such as zirconocene, hafnocene, titanocene or chromocene, or Ziegler catalyst supported on silica, for example based on titanium or vanadium may also be advantageously used. The abovementioned catalysts or catalyst systems may be introduced as they are directly in the fluidised bed reactor or may be converted beforehand into olefin prepolymer, in particular in the course of a prepolymerisation bringing the catalyst or catalyst system into contact with one or more olefins such as those referred to above, in a hydrocarbon liquid medium or in gaseous phase, according, for example, to a non-continuous or continuous process. For example, the present process may use a metallocene type catalyst such as those described in EP 0 129368, EP 0 206794, EP 0 420436 and EP 0 416815. It is also possible to use late transition metal e.g. platinum or palladium, catalyst complexes such as those described in WO 9623010.

I claim:

1. Process for introducing a solid particles feed into a fluidised or agitated vessel utilising a feed delivery device, a vertical feed dilution pipe and a feed injection pipe connected to the vessel, said process comprising the following steps:

(a) introducing the solid particles feed from the feed delivery device into the vertical feed dilution pipe, (b) diluting the solid particles feed by letting the solid particles reaching by gravity their terminal velocity in the feed dilution pipe, (c) introducing the diluted solid particles feed into the injection pipe and mixing it with a conveying gas, and (d) introducing said gas conveyed diluted solid particles feed into the vessel.

2. Process according to claim 1 wherein the introduction step of the solid particles feed into the vertical feed dilution pipe (a) and the solid particles dilution step obtained by letting the solid particles reaching by gravity their terminal velocity (b), are performed in the absence of any conveying, motive or flushing gas.

3. Process according to claim 1 or 2 wherein the vertical feed dilution pipe and the injection pipe are in the form of a cylinder.

4. Process according to claim 1 or 2 wherein the solid particles are olefin polymerization catalysts.

5. Process according to any of the preceding claims wherein the terminal velocity of the particles is calculated from the equation as defined in the description.

6. Process for the continuous polymerization of olefin(s) in a gas phase fluidised bed reactor wherein the polymerisation catalyst Is introduced into the reactor using an introduction process in accordance with claim 1 or 2.

7. Process according to claim 1 or 2 wherein the terminal velocity of the particles is calculated from the following equation:

$$u_* = u_t \left[ \frac{\rho_f^2}{g\mu(\rho_s - \rho_f)} \right]^{1/3}$$

with $$u_* = \left[ \frac{18}{d_*^2} + \frac{(2.3348 - 1.7439\phi)}{d_*^{0.5}} \right]^{-1}$$

where $0.5 \leq \phi \leq 1$ $$d_* = d_{sph} \left[ \frac{g\rho_f(\rho_s - \rho_f)}{\mu^2} \right]^{1/3}$$

* * * * *

UNITED STATES PATENT AND TRADEMARK OFFICE
CERTIFICATE OF CORRECTION

PATENT NO. : 6,398,463 B1
DATED : June 4, 2002
INVENTOR(S) : Morterol

It is certified that error appears in the above-identified patent and that said Letters Patent is hereby corrected as shown below:

<u>Column 6,</u>
Line 43, after the equation, insert
-- wherein
$d_{sph}$ equivalent spherical diameter [m]
$d_*$ dimensionless particle diameter
$g =$ 9.81 m/s$^2$
$u_t$ terminal velocity of particle in fluid [m/s]
$u_*$ dimensionless particle velocity
$\mu$ viscosity if fluid [kg/m.s]
$\rho_f$ density of fluid [kg/m$^3$]
$\rho_s$ density of particle [kg/m$^3$]
particle sphericity. --

Signed and Sealed this

Twenty-ninth Day of October, 2002

Attest:

JAMES E. ROGAN
Attesting Officer
Director of the United States Patent and Trademark Office